(No Model.)
E. P. LYNCH.
PLOW.
No. 400,468. Patented Apr. 2, 1889.
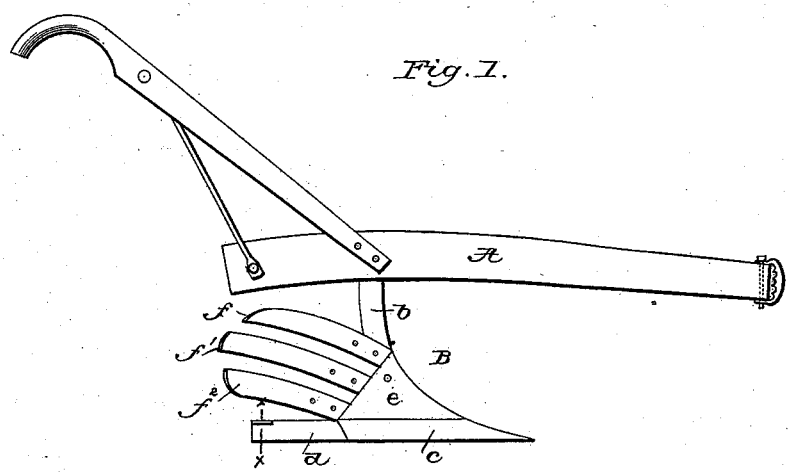
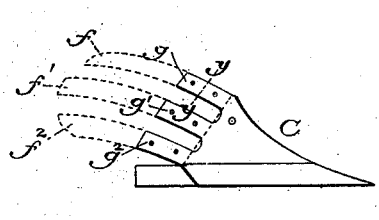
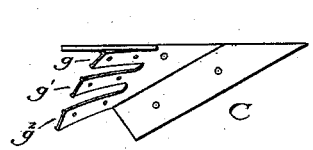
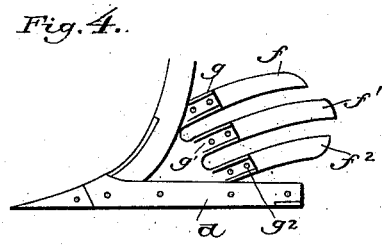
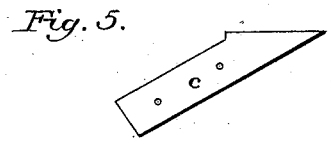
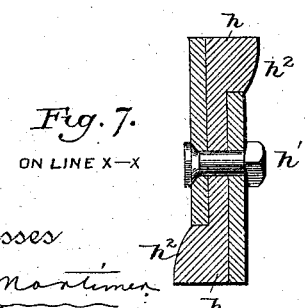
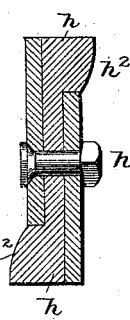
Witnesses
M. M. Mortimer
J. G. Jones
Inventor
E. P. Lynch
By Phil. T. Dodge.
Attorney

UNITED STATES PATENT OFFICE.

EDWARD P. LYNCH, OF DAVENPORT, IOWA.

PLOW.

SPECIFICATION forming part of Letters Patent No. 400,468, dated April 2, 1889.

Application filed December 6, 1888. Serial No. 292,800. (No model.)

*To all whom it may concern:*

Be it known that I, EDWARD P. LYNCH, of Davenport, in the county of Scott and State of Iowa, have invented certain Improvements in Mold-Board Plows, of which the following is a specification.

The object of my invention is to provide a mold-board plow which may be operated with a moderate expenditure of power in adhesive tenacious soils, and to so construct the same that its various parts subject to rapid wear may be independently removed and renewed.

My plow is provided, like other mold-board plows, with a share and landside and a solid front portion to the mold-board to erect or upturn the slice; but the upper or rear portion of the mold-board, instead of being made with a solid or unbroken surface, is composed of a series of longitudinal arms or fingers separated by intervening slots or openings, so as to reduce the surface in contact with the slice passing thereover.

I am aware that mold-boards have been divided by longitudinal slots into arms or fingers, and that plows having this feature have been variously constructed as regards the formation and construction of their parts.

My invention resides in an improved construction and combination of parts, as hereinafter explained.

In the accompanying drawings, Figure 1 represents in side elevation a plow containing my improvements. Fig. 2 is a side elevation of the plate by which the share, the landside, and the mold-board sections are sustained. Fig. 3 is a top plan view of the same. Fig. 4 is a view of the same from the landside. Fig. 5 is a top plan view of the share. Fig. 6 is a side elevation of the landside. Fig. 7 is a vertical cross-section through the rear end of the landside and the support on the line $x\,x$, Fig. 1. Fig. 8 is a cross-section on the line $y\,y$, Fig. 2.

Referring to the drawings, A represents the beam of the plow, and B the plow proper, connected to the beam by a rigid standard, $b$, or other ordinary connections of any suitable character.

The plow consists, as usual, of a mold-board, a share, and a landside. These parts are connected and sustained by a plate, C, such as shown in Figs. 2, 3, and 4. The share $c$ and landside $d$, which may be constructed in the ordinary form, are bolted to the lower edges of the plate C in the customary relation to each other. Above the share $c$ a plate, $e$, of triangular or similar shape, forming the lower forward part of the mold-board and serving to turn the slice to an upright or substantially upright position, is removably bolted to the supporting-plate C.

The upper rear portion of the mold-board, by which the slice is carried and inverted after leaving the plate $e$, is composed of a series of longitudinal arms, $f f'$, &c., which is separably constructed and individually bolted to arms $g g'$, &c., extending upward and rearward from the plate C and forming an integral portion thereof. The plate $e$ and the arms $f$ constitute jointly the mold-board, and they are given a surface curvature corresponding to that usually given the mold-board, so that they will operate in like manner to sustain and turn the slice.

It will be observed that my plow consists, essentially, of a supporting-plate, C, the independent arms, as usual, and the landside, all bolted independently thereto. The plate $e$, located at the point at which the greatest wear is received upon the mold-board, may be removed and replaced by another and similar plate without disturbing the arms $f$ on the share, and in like manner the share and landside may be removed and replaced by others without disturbing the other parts of the plow.

The construction shown is advantageous because of its simplicity, the rigidity of the structure, the fact that it permits the various sections to be renewed independently, and the fact that the joints or seams are in positions which will not produce uneven wear or affect the operation of the parts.

In order to prevent undue wear of the landside, which is bolted to a rearwardly-extending arm on the plate C, I propose to employ a reversible wearing-block, $h$, such as shown in Figs. 6 and 7. This block of chilled iron or other hard metal will be inserted between the rear end of the landside and the supporting-arm, as shown in Fig. 7, and confined by a through-bolt, $h'$, or similar fastening. It is provided at opposite ends with the two projecting wearing-surfaces $h^2$, either of which may be brought into position by reversing the plate, so as to project beyond the face of the landside in order to take both the wear on the outer face and on the soil.

The supporting-plate C may be formed integral with the standard as an immovable portion of the plow, or it may be bolted removably in place. In the latter case the mold-board as a whole—that is to say, embracing plate C, the plate $e$, and the arms $f$—may be applied to and removed from the plow in the same manner that an ordinary solid mold-board is applied and removed.

In order to give the arms $f f'$ the requisite rigidity without making them of undue weight, I construct them with strengthening-ribs on the rear face in the manner shown in Fig. 8, or any similar manner.

It will of course be understood that instead of bolting the various sections of the plow to the supporting-plate C, they may be keyed thereto in the manner commonly practiced in connecting the parts of other plows.

I am aware that plows have been variously constructed with mold-boards of slatted construction from the share to the rear end, and this I do not broadly claim. It is to be noticed as a distinguishing feature of my plow that the share and the adjacent portion of the mold-board present solid unbroken surfaces, while slatted arms extend thence rearward and are left free at the extremities. In practice I find that this construction is advantageous, in that the solid front of the mold-board will effectually upturn the slice without fracturing the same, while the rear arms will complete the overturning operation. In many kinds of soil a mold-board having its forward end slatted is impracticable and inoperative.

Having thus described my invention, what I claim is—

1. A mold-board plow comprising the foundation-plate C, with the share, the landside, the arms $f f'$, and the plate $e$, independently and removably bolted thereto, the plate $e$ being formed, as shown, to serve as the forward portion of the mold-board for erecting the slice in advance of the arms $f f'$.

2. A mold-board having the share, the solid portion $e$, immediately above the share to erect the slice, and the slatted portion at the rear to complete the turning over of the slice.

3. In a mold-board plow, a sustaining-plate, C, the share $c$, removably secured to its lower forward edge, the series of arms $f f'$, removably secured to its rear edge, the independently-removable mold-board section $e$, located between the share and the arms $f$, as shown.

4. In combination with the notched landside and the sustaining-arm to which it is bolted, the wearing-plate having the body portion confined between said arms and landside, and the thickened base portion projected through the notch in and beyond the base of the landside, as shown.

5. In combination with the landside and the stationary arm to which it is bolted, the intermediate wearing-plate having projections $h^2$ on opposite faces and both opposite edges, and the through-bolt, said parts constructed and arranged, as shown, to permit the reversal of the wearing-plate, in the manner described.

In testimony whereof I hereunto set my hand this 8th day of October, 1888, in the presence of two attesting witnesses.

EDWARD P. LYNCH.

Witnesses:
B. M. WELLS,
GEORGE J. BARKER.